(No Model.) 2 Sheets—Sheet 1.

D. LUBIN.
CLOD CRUSHER.

No. 357,843. Patented Feb. 15, 1887.

Witnesses
Geo. H. Strong.
J. H. Strouse.

Inventor,
David Lubin
By Dewey & Co.
Atty (No Model.) 2 Sheets—Sheet 2.

D. LUBIN.
CLOD CRUSHER.

No. 357,843. Patented Feb. 15, 1887.

Witnesses,
Geo. H. Strong
G. H. Krouse

Inventor,
David Lubin
By Dewey & Co.
Atty

UNITED STATES PATENT OFFICE.

DAVID LUBIN, OF SACRAMENTO, CALIFORNIA.

CLOD-CRUSHER.

SPECIFICATION forming part of Letters Patent No. 357,843, dated February 15, 1887.

Application filed October 27, 1886. Serial No. 217,365. (No model.)

*To all whom it may concern:*

Be it known that I, DAVID LUBIN, of Sacramento, Sacramento county, State of California, have invented an Improvement in Clod-Crushers; and I hereby declare the following to be a full, clear, and exact description of the same.

My invention relates to an improved device for breaking or disintegrating clods or masses of earth and working or reducing the same. It consists of a series of disks or rollers, which may be fastened solid to the shaft or may be arranged to work independently, having their peripheries provided with teeth or points which will enter the ground, or formed with a sharp edge or edges, which will act as a cutter or crusher, and, in connection with these, of a series of arms projecting from between the disks and fulcrumed upon the axle or shaft of the frame, so that they may be turned to present their points toward the front or direction in which the machine is traveling, or may be reversed, so that the curved points will enter the ground and be drawn along in this position, following the disks or rollers and acting as a harrow, leveler, or cultivator, and to cover seed, as will be more fully described by reference to the accompanying drawings, in which—

Figure 1:
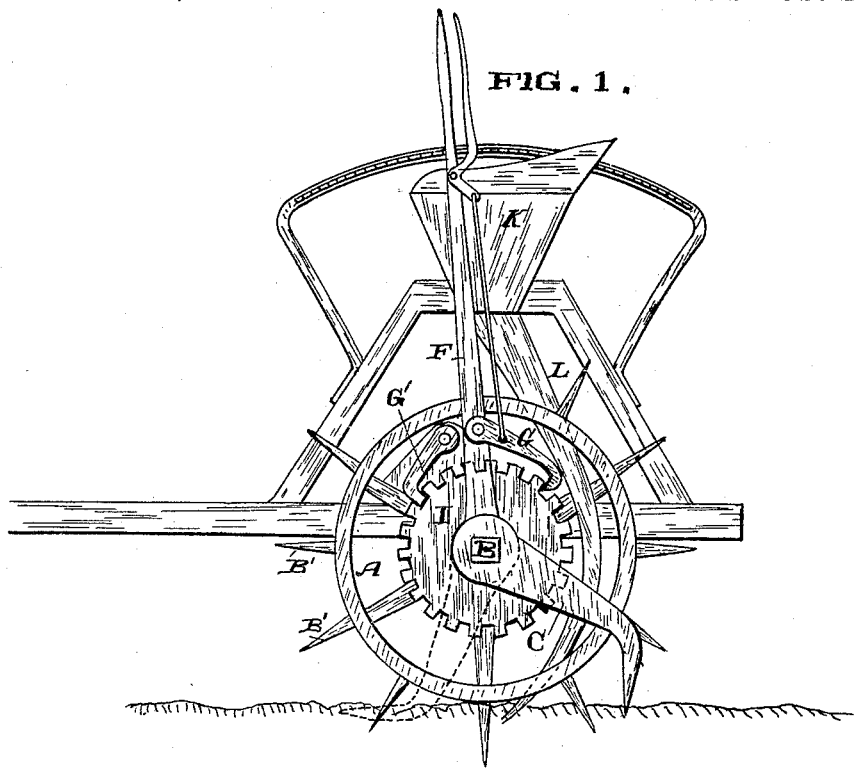
Figure 2:
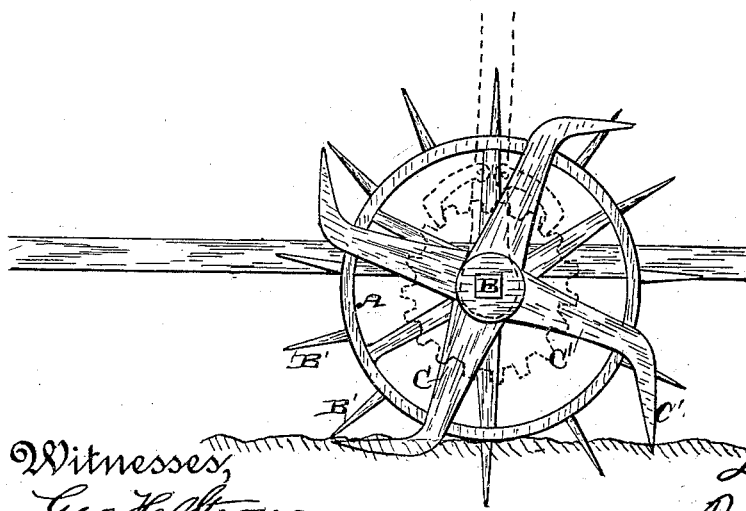
Figure 3:
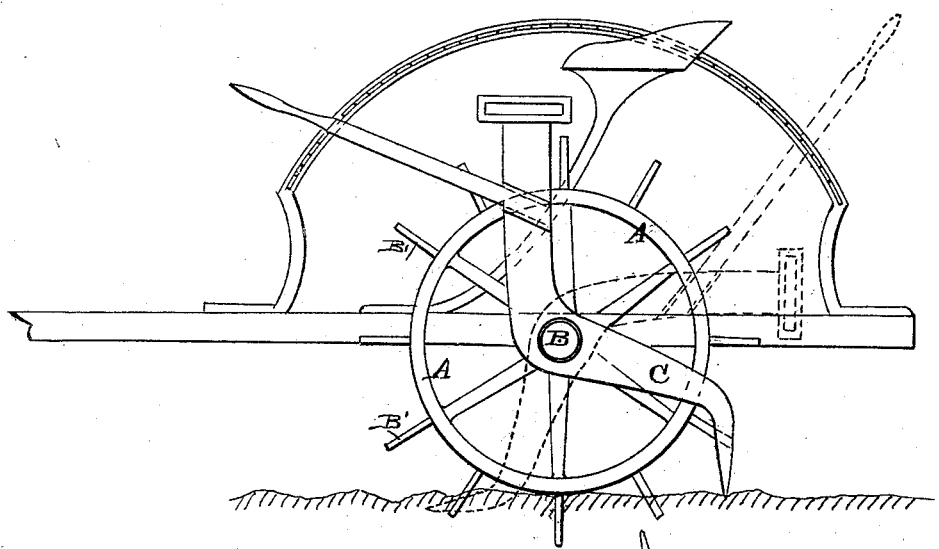
Figure 4:
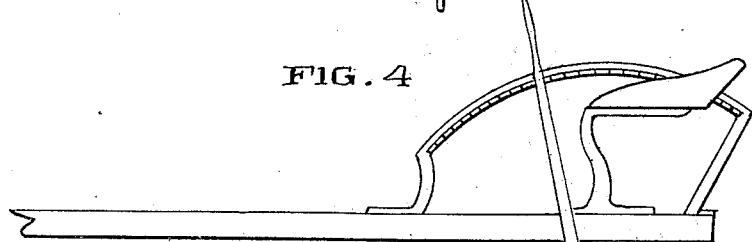
Figure 5:
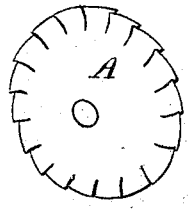
Figure 5:
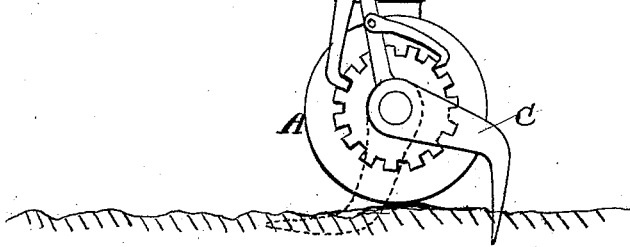

Figure 1 is a vertical section of my apparatus, showing the points extended to the rear. Fig. 2 is a vertical section showing one series of points toward the front and another to the rear, reversed to act as a harrow and leveler. Figs. 3, 4, and 5 show modifications of the device.

A are disks mounted upon a shaft or axle, B, either fixed or so as to turn upon it loosely and independently. These disks may have projecting spikes or teeth B', either straight or standing at an angle to either side, and which will travel upon and penetrate the ground as the machine is drawn along over it; or the edges of the disks may be drawn down to a thin edge sufficiently sharp so that the weight of the machine passing over the ground will cause the edges to enter and act in the same manner that the teeth would do; or these disks may be made concavo-convex. Between each pair of these disks, which extend the whole width of the machine, are a series of arms, C, and these arms are curved so as to present their ends at a short distance beyond the periphery of the disks or the outer ends of the teeth when the latter are used upon the disks. These arms may be one or more in number in each case, and the points are so curved that when projecting forward or in the direction in which the machine is traveling they will enter the ground so as to lift up any clods or large pieces and bring them backward where the teeth or edges of the disks will act to crush or break them.

In some cases it may be found desirable to employ this device as a harrow or for the purpose of reducing or leveling or pulverizing the ground after the rollers or disks have passed over it. In this case the arms will be allowed to turn backward until they stand at a point where the downward curve will enter the ground in the manner of harrow or cultivator teeth, and they will then be fixed in that position, so that the teeth dragging after the rollers stir and loosen up the ground, as before described. In this position they also act, in conjunction with the teeth of the disks, to break the clods which are lodged against them in the same manner as when pointing to the front. In some cases it may be found preferable to so divide these arms that one point, C, extends to the front between each pair of disks to lift up the clods and loosen the ground, while the other point, C', extends to the rear to harrow or level the soil after the roller has passed, as shown in Fig. 2. These arms may be fixed with relation to each other, or they may be adjustable, so that either one or both may be regulated to enter the ground to a greater or less degree.

The disks may be plane or concavo-convex to act as plows, and these disks may be mounted upon straight continuous shafts; or the shafts may be centrally divided and so journaled that they rotate at an obtuse angle with each other, thus causing the disks and arms to act more effectively together. It may be found preferable in some cases to slit the edges of the disks and turn them so as to stand at an angle, as shown in Fig. 5, the object in all cases being to loosen and turn the soil as much as possible.

The disks are preferably mounted to turn upon the shaft or axle, and the arms C are so fitted as to be adjusted upon it.

Various forms of supporting mechanism may be employed. In Fig. 1 I have shown hubs with square holes in them to fit over the square axle, so that they will turn with it. A lever, F, extends upward at the side of the machine, the lower end being suitably fulcrumed, and a pawl, G, is attached to the frame, so that its point or edge will engage the teeth of the ratchet-wheel I upon the axle of the machine, so that when the lever is operated the pawl will, by engaging the ratchet, turn that, and with it the shaft so as to place the arms in any desired position, either with the points forward or entirely clear of the ground, or so that the points of one set of arms will enter the ground behind the disks or rollers, as heretofore described; or one set may act as lifters in front and the other as levelers behind. In combination with this mechanism I have shown a seeder, K, which may be of any ordinary or well-known pattern, with spouts L extending down between the disks, so as to distribute seed, which will afterward be covered by the action of the disks and the teeth which are being dragged behind.

In a former application made by me September 30, 1886, No. 214,968, a machine is shown with projecting teeth and arms somewhat similar to those herein described; but in that case no provision is made by which these arms may be made to enter the ground behind the disks, so as to act to crush, loosen, pulverize, and level the ground while in that position, and this is the invention which I now wish to protect.

Having thus described my invention, what I claim as new, and desire to secure by Letters Patent, is—

1. A series of rotating disks, in combination with arms or fingers having the points projecting beyond the periphery of the disks or the ends of the teeth thereon, so that said points may be made to enter the ground either in front of or behind the disks or rollers, or both, substantially as herein described.

2. A series of rotating disks having radial or angular teeth or sharpened edges, either plane or concavo-convex, and a series of arms or fingers projecting and adjustable with relation to each pair of disks, in combination with a mechanism whereby these arms may be held so as to enter the ground in front of the disks and act as lifters, or enter behind the disks to act to stir or pulverize or level the soil, or both at once, substantially as herein described.

In witness whereof I have hereunto set my hand.

DAVID LUBIN.

Witnesses:
S. H. NOURSE,
H. C. LEE.